US009060082B2

(12) United States Patent
 Watanabe

(10) Patent No.: US 9,060,082 B2
(45) Date of Patent: Jun. 16, 2015

(54) WIRELESS COMMUNICATION SYSTEM, WIRELESS COMMUNICATION DEVICE, AND COMMUNICATION CONTROL PROGRAM

(71) Applicant: Junji Watanabe, Nagoya (JP)

(72) Inventor: Junji Watanabe, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/038,450

(22) Filed: Sep. 26, 2013

(65) Prior Publication Data

US 2014/0085675 A1 Mar. 27, 2014

(30) Foreign Application Priority Data

Sep. 27, 2012 (JP) ................................. 2012-213843

(51) Int. Cl.
 *H04N 1/00* (2006.01)
 *H04N 1/32* (2006.01)
 *H04N 1/327* (2006.01)

(52) U.S. Cl.
 CPC ....... *H04N 1/00281* (2013.01); *H04N 1/00233* (2013.01); *H04N 1/32635* (2013.01); *H04N 1/32662* (2013.01); *H04N 1/32786* (2013.01); *H04N 2201/0015* (2013.01); *H04N 2201/0055* (2013.01); *H04N 2201/0094* (2013.01)

(58) Field of Classification Search
 USPC ................. 358/1.14, 1.15, 437; 455/39, 41.1, 455/422.1; 709/227
 See application file for complete search history.

(56) References Cited

U.S. PATENT DOCUMENTS

| 7,493,582 | B2 * | 2/2009 | Komaki | ........................ 716/119 |
| 2011/0122434 | A1 * | 5/2011 | Kim | ............................ 358/1.15 |
| 2011/0177780 | A1 | 7/2011 | Sato et al. | |

(Continued)

FOREIGN PATENT DOCUMENTS

| JP | 2007-166538 A | 6/2007 |
| JP | 2010-178002 A | 8/2010 |
| JP | 2011-146991 A | 7/2011 |

OTHER PUBLICATIONS

"Wi-Fi Peer-to-Peer (P2P) Technical Specification, Version 1.1", Wi-Fi Alliance Technical Committee P2P Task Group, 2010, 159 pages.

(Continued)

*Primary Examiner* — Allen H Nguyen
(74) *Attorney, Agent, or Firm* — Banner & Witcoff, Ltd.

(57) ABSTRACT

A wireless communication system includes: a first communication device, which has a first controller coupled to a first interface configured; and a second communication device, which has a second controller coupled to a second interface configured; wherein at least one of the first controller and the second controller is configured to: transmit data from the first communication device to the second communication device after establishing a connection of the wireless communication between the first communication device and the second communication device; determine, based on one of information regarding the data, information regarding the wireless communication, information regarding the first communication device and information regarding the second communication device, one of a plurality of different cutoff conditions as a cutoff condition; and terminate the connection of the wireless communication which has been performed after the data transmission is completed if the determined cutoff condition is satisfied.

12 Claims, 9 Drawing Sheets

(56) References Cited

U.S. PATENT DOCUMENTS

| | | | |
|---|---|---|---|
| 2011/0194147 A1* | 8/2011 | Kato | 358/1.15 |
| 2011/0237241 A1* | 9/2011 | Nagasaki | 455/422.1 |
| 2011/0320611 A1* | 12/2011 | Inada et al. | 709/227 |
| 2012/0274972 A1* | 11/2012 | Nishikawa | 358/1.14 |
| 2013/0083348 A1* | 4/2013 | Yamada | 358/1.14 |
| 2013/0260683 A1 | 10/2013 | Suzuki et al. | |

OTHER PUBLICATIONS

Jan. 9, 201—Co-pending U.S. Appl. No. 14/593,548.

* cited by examiner

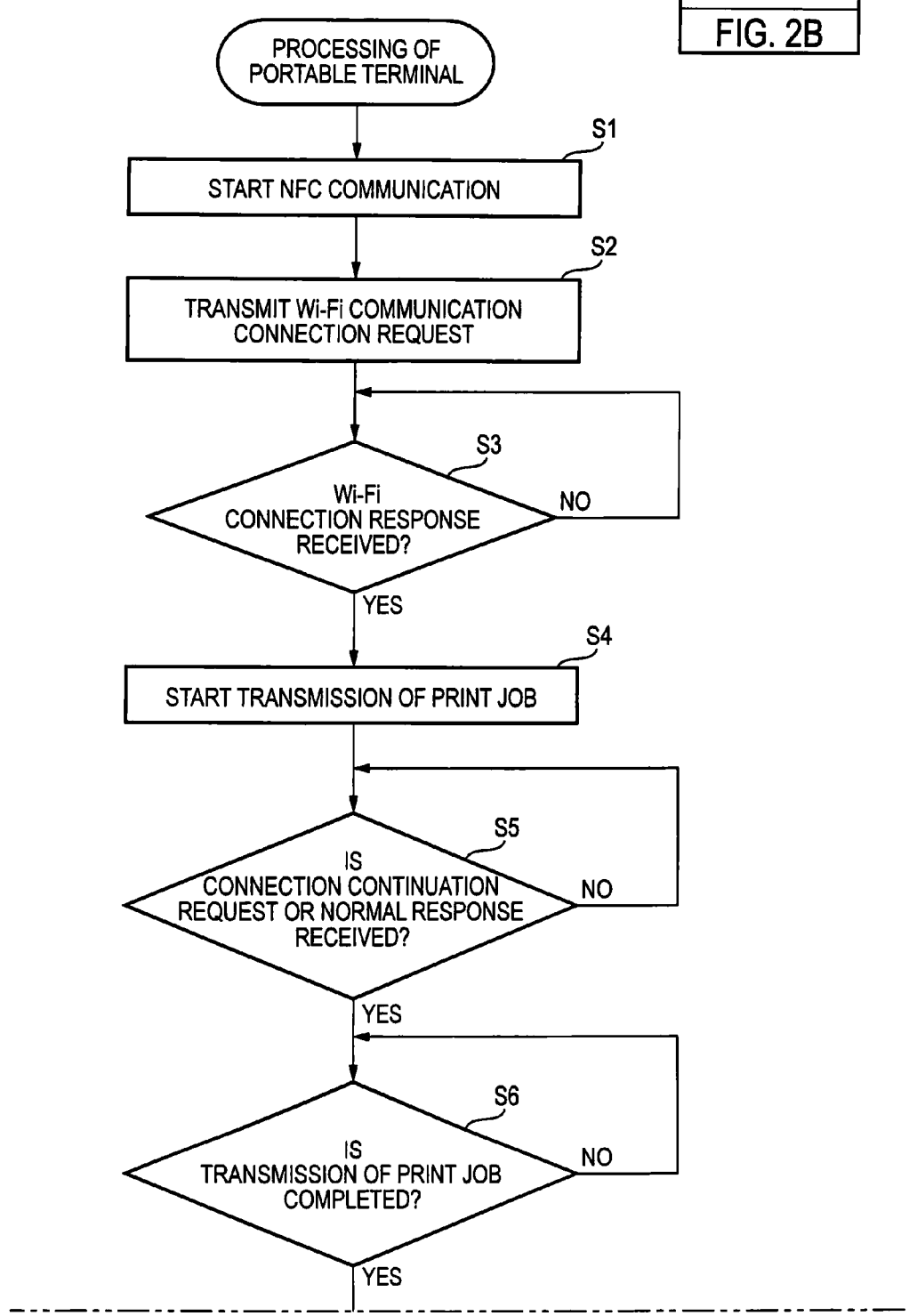

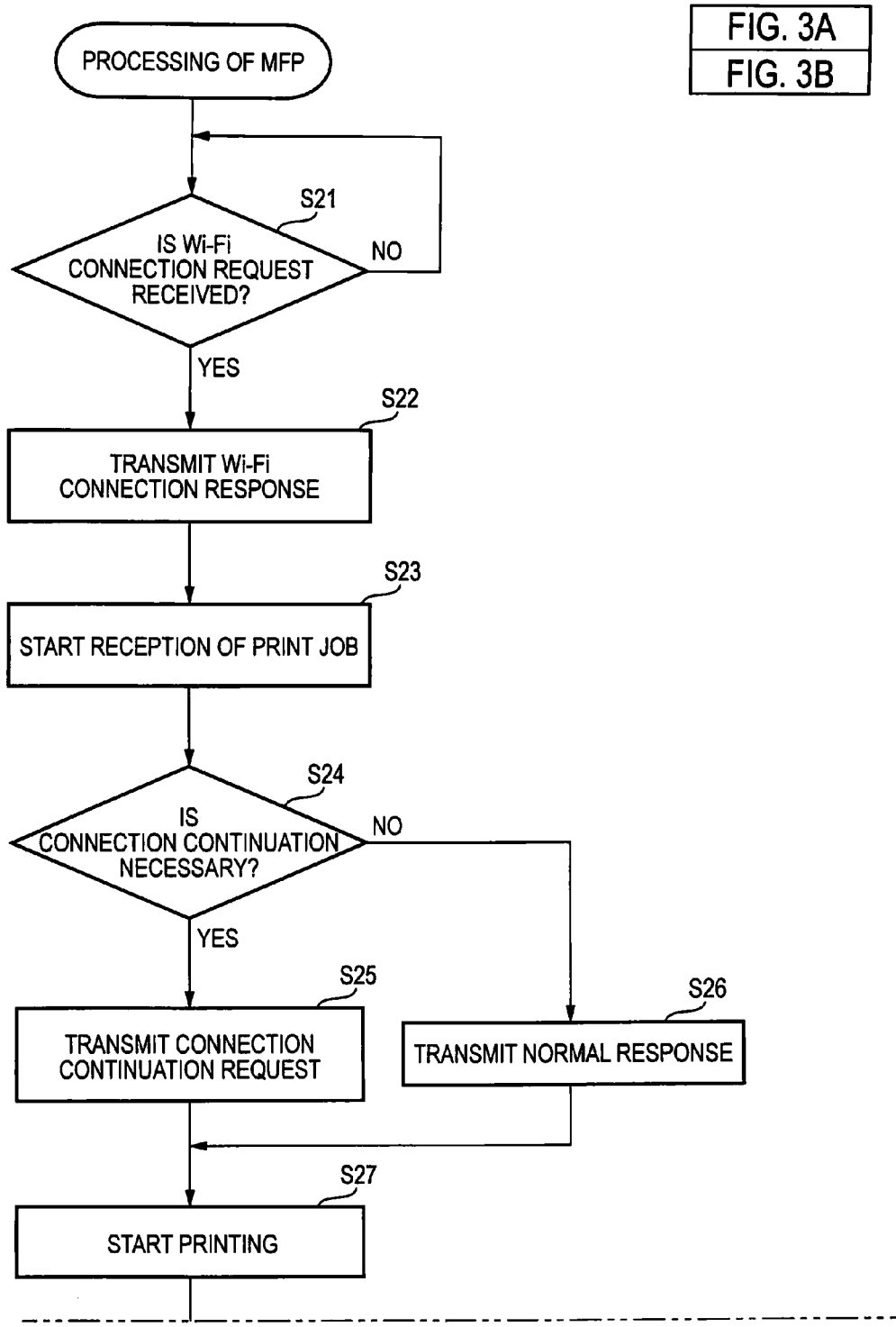

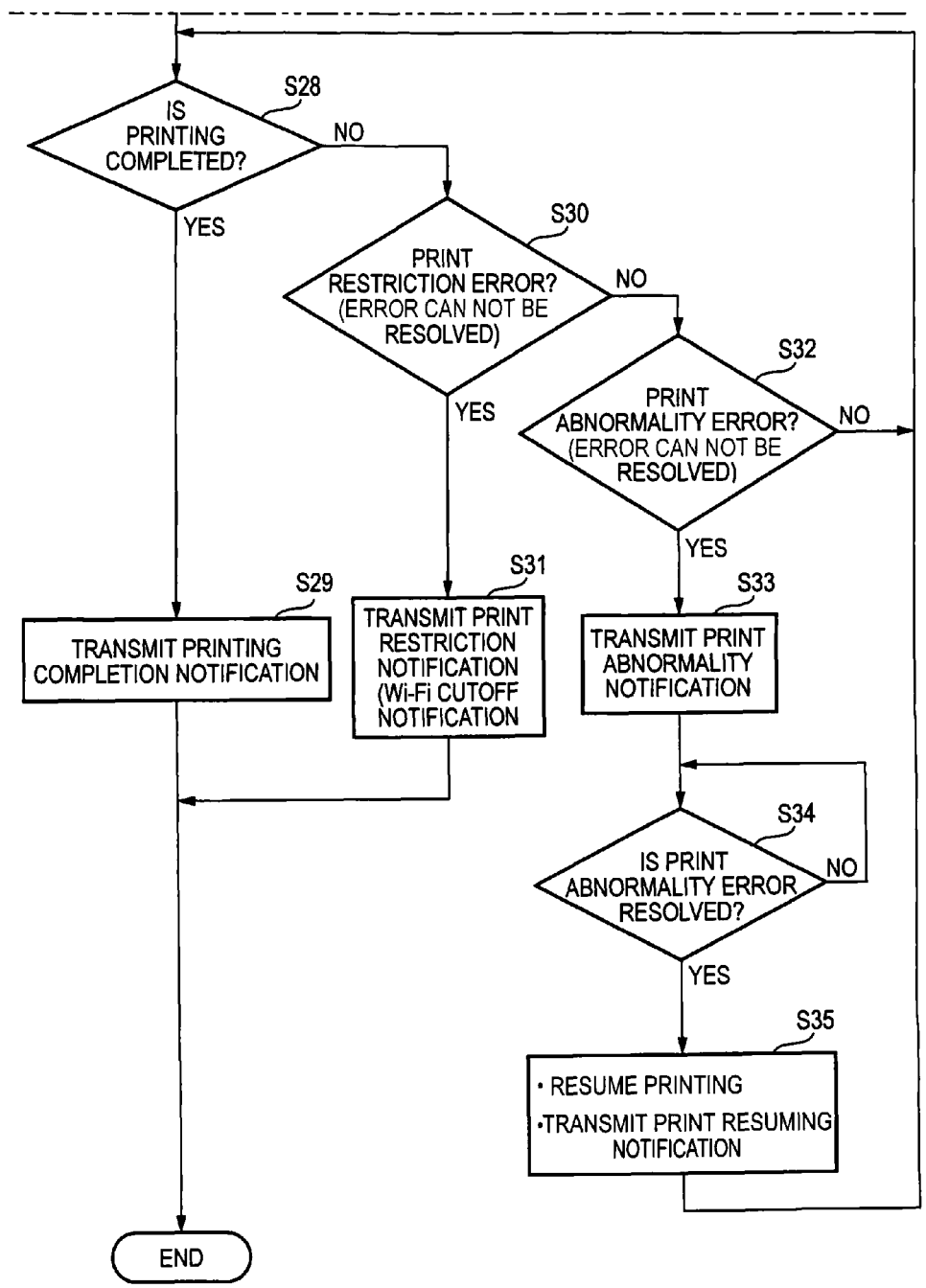

WIRELESS COMMUNICATION SYSTEM, WIRELESS COMMUNICATION DEVICE, AND COMMUNICATION CONTROL PROGRAM

CROSS-REFERENCE TO RELATED APPLICATION

This application claims priority from Japanese Patent Application No. 2012-213843 filed on Sep. 27, 2012, the entire subject matter of which is incorporated herein by reference.

TECHNICAL FIELD

This disclosure relates to the technology to perform wireless communication between a plurality of communication devices.

BACKGROUND

There is a wireless communication system which includes an initiator that is a wireless communication device of a data transmission side and a target that is a wireless communication device of a data reception side. In this wireless communication system, the initiator establishes connection of wireless communication by Bluetooth® with the target, completes data transmission to the target, and then terminates the wireless communication process.

SUMMARY

However, in the above wireless communication system, if the initiator is configured to terminate the connection of the wireless communication immediately after completion of the data transmission, there may be a problem that the initiator is unable to receive, for example, a data reception error notification from the target. On the other hand, if the initiator is configured not to terminate the connection of the wireless communication for a long time even if the initiator completes the data transmission, there may be a problem that power is unnecessarily consumed to maintain the connection of the wireless communication, for example, without the wireless communication being carried out. That is, according to the configuration that always terminates the connection of the wireless communication with the same condition after completion of the data transmission, convenience of the wireless communication is low.

In this disclosure, a technology capable of improving convenience of the wireless communication is disclosed as compared with the configuration that always terminates the connection of the wireless communication with the same condition after completion of the data transmission.

In one aspect of this disclosure, a wireless communication system comprises: a first communication device, which has a first controller coupled to a first interface configured to perform a wireless communication; and a second communication device, which has a second controller coupled to a second interface configured to perform a wireless communication. At least one of the first controller and the second controller is configured to: transmit data from the first communication device to the second communication device after establishing a connection of the wireless communication between the first communication device and the second communication device; determine, based on one of information regarding the data, information regarding the wireless communication, information regarding the first communication device and information regarding the second communication device, one of a plurality of different cutoff conditions as a cutoff condition; and terminate the connection of the wireless communication which has been performed by the first interface and the second interface after the data transmission is completed if the determined cutoff condition is satisfied.

The wireless communication system selects any one of a plurality of different cutoff conditions to terminate the connection of wireless communication by the interface when the data transmission is completed, and terminates the connection of the wireless communication if it is determined that the selected cutoff condition is satisfied. That is, according to this wireless communication system, depending on which of plural cutoff conditions is selected, the connection of wireless communication can be cut off with different conditions. Through this, convenience of the wireless communication can be improved as compared with the configuration that always terminates the connection of the wireless communication with the same condition after completion of the data transmission.

On the other hand, this disclosure can be realized in various aspects, such as a wireless communication system, a wireless communication device, a method for cutting off wireless communication, a computer program for realizing functions of the method or the device, a recording medium recorded with the computer program, and the like.

According to the invention disclosed in the description, the convenience of the wireless communication can be improved as compared with the configuration that always terminates the connection of the wireless communication with the same condition after the completion of the data transmission.

BRIEF DESCRIPTION OF THE DRAWINGS

The foregoing and additional features and characteristics of this disclosure will become more apparent from the following detailed descriptions considered with the reference to the accompanying drawings, wherein:

FIG. 3, which is composed of FIG. 3A and FIG. 3B, is a flowchart illustrating processing of MFP;

DETAILED DESCRIPTION

Embodiment 1

Figure 1:
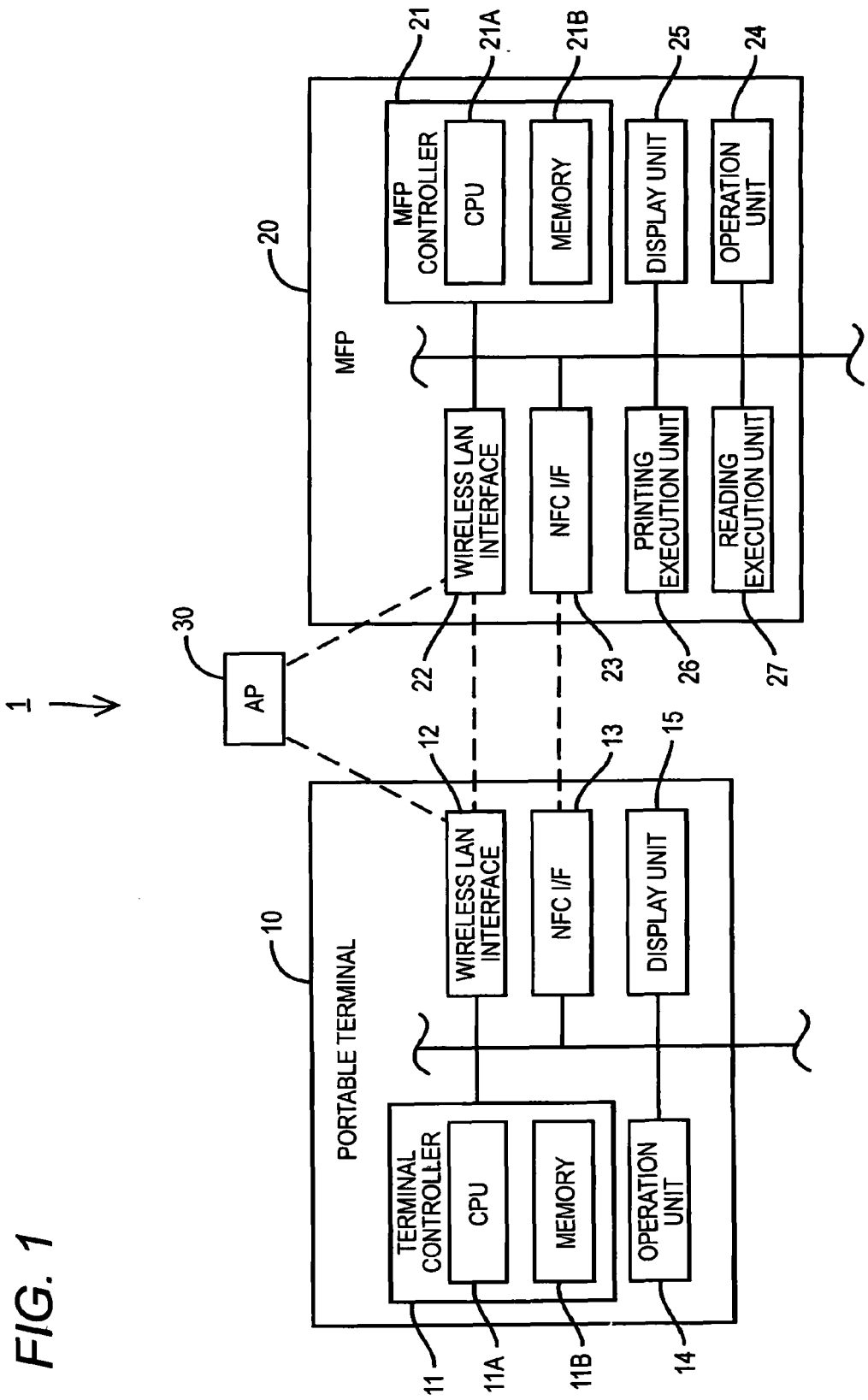
FIG. 1 is a block diagram illustrating a wireless communication system according to embodiment 1.

Embodiment 1 will be described with reference to FIGS. 1 to 4. As shown in FIG. 1, a wireless communication system 1 according to this embodiment includes a portable terminal 10, a multifunction peripheral (hereinafter referred to as "MFP") 20, and an access point (hereinafter referred to as "AP") 30.

(Configuration of a Portable Terminal)

A portable terminal 10 is an example of a first communication device, and it may be a portable phone (i.e., smart phone), a PDA, a notebook PC, a tablet PC, a portable music player, or a portable moving image player. The portable terminal 10 includes a terminal controller 11 (an example of a first controller), a wireless LAN interface 12, an NFC interface 13, an operation unit 14, and a display unit 15.

The terminal controller 11 includes a central processing unit (hereinafter referred to as "CPU") 11A and memory 11B. The memory 11B includes, for example, a ROM or a RAM. In the ROM, various kinds of programs, such as an OS, an application capable of preparing print data, a printer driver for controlling the MFP 20, an application capable of processing read data from the MFP 20, and a program for executing processing of a portable terminal (an example of a communication control program) which will be described later, are stored. The CPU 11A controls respective units of the portable terminal 10 according to the program read from the ROM. On the other hand, a recording medium, in which the various kinds of programs are stored, may be a CD-ROM, a hard disk drive, or a nonvolatile memory, such as a flash memory (registered trademark).

The wireless LAN interface 12 is an interface, an example of a first interface and a first long-distance interface, and an interface for the terminal controller 11 to perform wireless communication according to a Wi-Fi direct method (hereinafter referred to as "WFD method") and wireless communication according to general Wi-Fi. According to the WFD method, the wireless communication is performed based on 802.11 standards of IEEE (The Institute of Electrical and Electronics Engineers, Inc.) and the following standards (e.g., 802.11a, 11b, 11g, and 11n). Further, the wireless communication according to the WFD method is a direct wireless communication that does not use AP 30. In this case, the wireless communication is monopolistically possible only between the wireless devices in a one-to-one manner, and unless the wireless communication connection is terminated, the wireless communication with the other wireless device is unable to be performed. The wireless communication according to general Wi-Fi is an indirect wireless communication that uses AP 30, and in this case, it is possible to perform the wireless communication between the wireless devices in a one-to-many manner. On the other hand, the Wi-Fi wireless communication is an example of long-distance wireless communication.

The NFC interface 13 is an interface, an example of a first interface and a first short-distance interface, and an interface through which the terminal controller 11 performs the short-distance wireless communication according to the NFC (abbreviation of Near Field Communication) method. On the other hand, the NFC wireless communication is performed based on ISO/IEC21481 or ISO/IEC18092 International Standards Organization. Further, the NFC method and the Wi-Fi method are wireless communication methods that are different from each other, and the communication speed of the Wi-Fi wireless communication is higher than the communication speed of the NFC wireless communication. Further, the communicable distance of the Wi-Fi wireless communication is longer than the communicable distance of the NFC wireless communication.

The operation unit 14 includes a plurality of buttons, and enables a user to execute various kinds of input operations. The display unit 15 includes a liquid crystal display or a lamp, and can display various kinds of setting screens or device operating states.

(Configuration of an MFP)

The MFP 20 is an example of a second communication device, and it includes an MFP controller 21 (an example of a second controller), a wireless LAN interface 22, an NFC interface 23, an operation unit 24, a display unit 25, a printing execution unit 26, and a reading execution unit 27.

The MFP controller 21 includes a CPU 21A and a memory 21B. The memory 21B includes, for example a ROM or a RAM, and programs in the ROM for executing MFP process, which will be described later, or programs for executing various kinds of operations of the printing execution unit 26 or the reading execution unit 27. The CPU 21A controls respective units of the MFP 20 according to the program read from the ROM. On the other hand, a recording medium, in which the various kinds of programs are stored, may be a CD-ROM, a hard disk drive, or a nonvolatile memory, such as a flash memory.

The wireless LAN interface 22 is an interface, an example of a second interface and a second long-distance interface, and an interface for the MFP controller 21 to perform the wireless communication according to the WFD method and the wireless communication according to the general Wi-Fi. The NFC interface 23 is an interface, an example of a second interface and a second short-distance interface, and an interface for the MFP controller 21 to perform the short-distance wireless communication according to the NFC method.

The operation unit 24 includes a plurality of buttons, and it enables a user to execute various kinds of input operations. The display unit 25 includes a liquid crystal display or a lamp to display various kinds of setting screens or device operating states. The printing execution unit 26 is an example of a process execution unit, and is an ink jet or electrophotographic print mechanism. The printing execution unit 26 prints an image based on print data that is received from the portable terminal 10 on a print sheet (not illustrated). The reading execution unit 27 has a reading device, such as a CCD (Charge Coupled Drive image sensor) or a CIS (Contact Image Sensor), and reads an image on a document sheet (not illustrated).

(Processing of Portable Terminal)

A user of the portable terminal 10 may input instructions for starting an application program and executing printing function or scanning function to the MFP 20 through the operation unit 14. Hereinafter, a case where execution instructions of the printing function is input will be described as an example, On the other hand, during the power-on of the MFP 20, the NFC interface 23 is in a state to detect a device capable of NFC wireless communication through generation of detection radio waves.

If the user makes the portable terminal 10 approach the MFP 20 after inputting the execution instructions of the printing function, and the distance between the portable terminal 10 and the MFP 20 becomes shorter than the distance in which the radio waves reaches between them (e.g., 10 cm), the NFC interface 13 receives the detection radio waves from the MFP 20, and transmits response radio waves to the MFP 20. Thereafter, the terminal controller 11 performs communication for establishing NFC communication connection (NFC communication session) between the portable terminal 10 and the MFP 20 in association with the MFP controller 21 of the MFP 20 through the NFC interfaces 12 and 23.

Figure 2B:
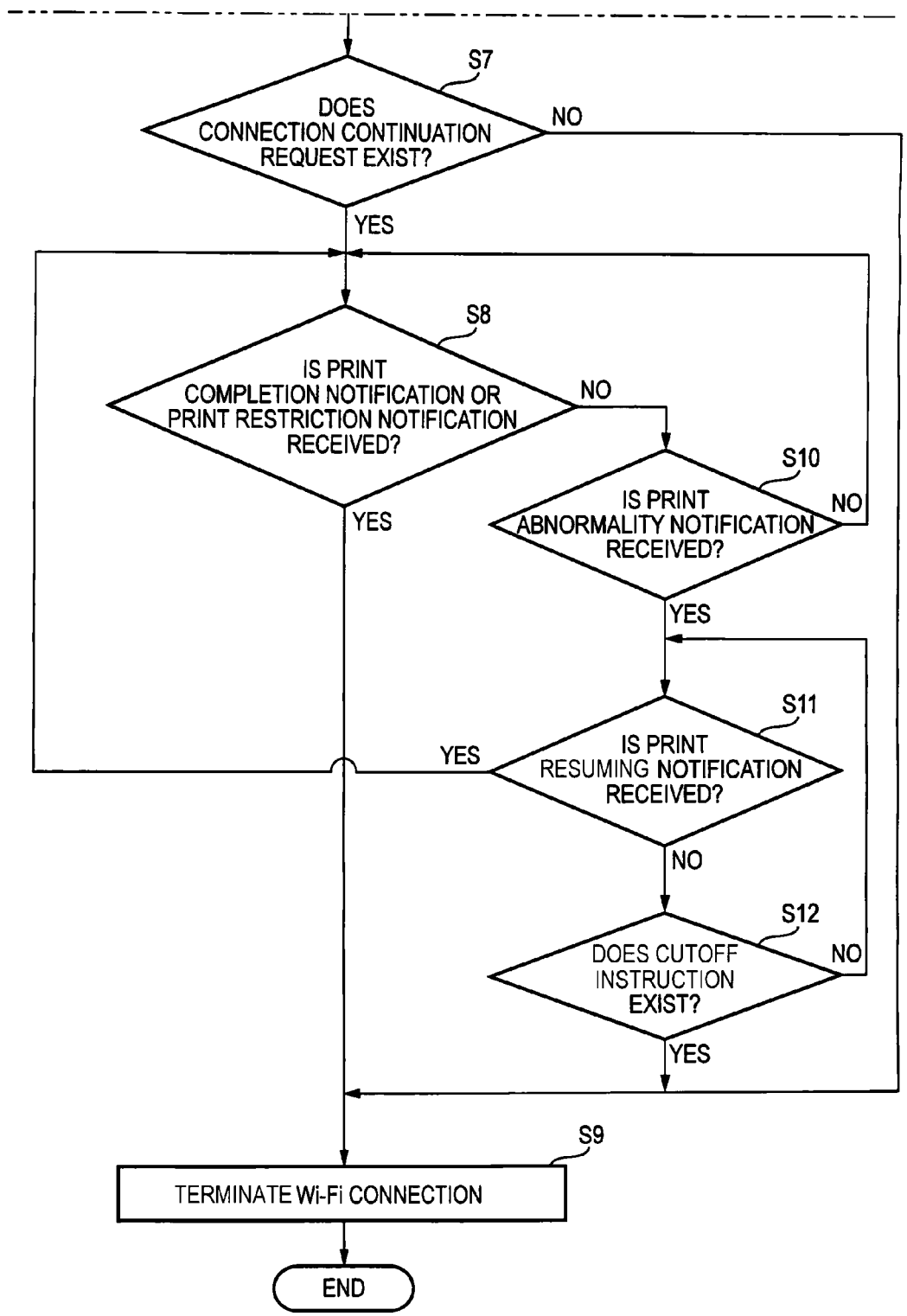
FIG. 2, which is composed of FIG. 2A and FIG. 2B, is a flowchart illustrating processing of a portable terminal.

If the NFC communication connection is established, the terminal controller 11 starts processing of portable terminal as illustrated in FIG. 2A, and starts NFC communication with the MFP 20 (S1). The terminal controller 11 transmits a Wi-Fi connection request to the MFP 20 through the NFC communication (S2). On the other hand, the Wi-Fi connection request includes Wi-Fi connection information (example of setting information) for establishing the Wi-Fi communication connection (Wi-Fi communication session). The Wi-Fi connection information includes an SSID (Service Set Identifier) that is an identifier for identifying, for example, a communication method, an authentication method, an encryption method, and a wireless network, or a BSSID (Basic Service Set Identifier) that is the unique identifier of an access destination that constructs the wireless network. In the following description, it is assumed that any one of the WFD method and a general Wi-Fi method is set as the communication method.

After transmitting the Wi-Fi connection request, the terminal controller 11 determines whether a Wi-Fi connection response thereto is received from the MFP 20 (S3). If it is determined that the Wi-Fi connection response is not received (NO in S3), the terminal controller 11 waits, and if it is determined that the Wi-Fi connection response is received (YES in S3), the terminal controller 11 establishes the Wi-Fi communication connection between the portable terminal 10 and the MFP 20. Through this, the Wi-Fi communication connection can be efficiently established as compared with the configuration in which the user himself inputs the Wi-Fi connection information to the MFP 20 by hand. Further, the terminal controller 11 starts the data transmission processing to transmit the print job to the MFP 20 based on the execution instructions of the printing function through the Wi-Fi communication (S4).

The print job includes print data and processing information. In this case, The print data is an example of data, and is an image data that is targeted for printing function. The processing information of the print job is an example of information regarding the data. Further, the processing information includes identification information of at least one of a user and a portable terminal, data information, and processing condition information. The data information includes, for example, a data amount of the print data and the print number of sheets. The processing condition information includes, for example, various kinds of printing conditions, such as a kind of a print sheet (cardboard, normal sheet, or the like) and a printing method (one side printing, duplex printing, and plural page printing on one sheet (called Nin1 printing).

After starting the print job, the terminal controller 11 determines whether a connection continuation request, which described later, or a normal response is received from the MFP 20 (S5). If it is determined that the connection continuation request or the normal response is not received (NO in S5), the terminal controller 11 waits, and if it is determined that the connection continuation request or the normal response is received (YES in S5), the terminal controller 11 stores the received connection continuation request or the normal response in the memory 11B. Further, the terminal controller 11 determines whether the transmission of a print job is completed (S6). If it is determined that the transmission of the print job is not completed (NO in S6), the terminal controller 11 waits, and if it is determined that the transmission of the print job is completed (YES in S6), the terminal controller 11 determines whether a connection continuation request is received from the MFP 20 (S7). Specifically, the terminal controller 11 determines that the connection continuation request is received (YES in S7) in the case where the connection continuation request is stored in the memory 11B, and determines that the connection continuation request is not received (NO in S7) in the case where the normal response is stored.

If it is determined that the connection continuation request is received (YES in S7), the terminal controller 11 waits until a print completion notification, a print restriction notification, or a print abnormality notification, which described later, is received from the MFP 20 (NO in S8 and NO in S10). On the other hand, if it is determined that the print completion notification or the print restriction notification is received (YES in S8), the terminal controller 11 terminates the connection of Wi-Fi communication with the MFP 20 (S9), and terminates the processing of portable terminal. The cutoff condition at this time is to terminate the connection of the Wi-Fi communication until the print completion notification or print restriction notification is received from the completion of the transmission of the print job, and is an example of a long-term cutoff condition.

On the other hand, if it is determined that the connection continuation request is not received (NO in S7), the terminal controller 11 terminates the connection of the Wi-Fi communication with the MFP 20 immediately after completion of the transmission of the print job without waiting for the reception of the print completion notification and the print restriction notification (S9), and terminates the processing of portable terminal. The cutoff condition at this time is to terminate the connection of the Wi-Fi communication before the print completion notification or print restriction notification is received from the completion of the transmission of the print job, and is an example of a short-term cutoff condition.

Further, if it is determined that the print abnormality notification which is be described later, rather than the print completion notification or the print restriction notification, is received from the MFP 20 (NO in S8 and YES in S10) in the case where it is determined that the connection continuation request is received (YES in S7), the terminal controller 11 determines whether a print resuming notification (see S35 in FIG. 3B), which will be described later, is received from the MFP 20 (S11). If it is determined that the print resuming notification is received (YES in S11), the terminal controller 11 returns to S8 while maintaining the connection of the Wi-Fi communication so as to make it possible to receive the print completion notification or the like from the MFP 20 after the print resuming.

For example, if it takes time to dissolve the print abnormality error or it is unable to dissolve the print abnormality error, the print resuming notification is not transmitted from the MFP 20. In this case, the terminal controller 11 determines that the print resuming notification is not received (NO in S11), and determines whether the operation unit 14 receives a cutoff instruction of the connection of the Wi-Fi communication by the user (S12). Then, if it is determined that the cutoff instruction is not received (NO in S12), the terminal controller 11 returns to S11 while maintaining the connection of the Wi-Fi communication, whereas if it is determined that the cutoff instruction is received (YES in S12), the terminal controller 11 terminates the connection of the Wi-Fi communication with the MFP 20 (S9), and ends the processing of portable terminal. Through this, even if the print resuming notification is not received, it can be determined whether to terminate the connection of the Wi-Fi communication by the user's intention.

That is, if the print restriction notification is received (YES in S8), in other words, if an error that cannot be resolved occurs in the MFP (YES in S30 which will be described later), the terminal controller 11 terminates the connection of the Wi-Fi communication without waiting for the user's cutoff instruction. The cutoff condition at this time is to terminate the connection of the Wi-Fi communication without waiting for the user's cutoff instruction, and is an example of a non-waiting cutoff condition.

On the other hand, if the print abnormality notification is received (YES in S10), in other words, if an error can be resolved occurs in the MFP (YES in S32 which will be described later), the terminal controller 11 terminates the connection of the Wi-Fi communication until the user's cutoff instruction is received. The cutoff condition at this time is to terminate the connection of the Wi-Fi communication until the user's cutoff instruction is received, and is an example of a waiting cutoff condition.

(Processing of MFP)

As described above, if the user makes the portable terminal 10 approach the MFP 20, and the NFC interface 23 receives the response radio waves from the portable terminal 10 and the MFP controller 21 performs communication for establishing the NFC communication connection (NFC communication session) between the portable terminal 10 and the MFP 20, the MFP controller 21 executes the processing of MFP as shown in FIG. 3, which is composed of FIG. 3A and FIG. 3B.

If it is determined that the Wi-Fi connection request is not received from the portable terminal 10 (NO in S21), the MFP controller 21 waits, and if it is determined that the Wi-Fi connection request is received (YES in S21), the MFP controller 21 transmits the Wi-Fi connection response to the portable terminal 10 through the NFC communication (S22), and starts the reception of the print job from the portable terminal 10 (S23).

Then, the MFP controller 21 determines whether the connection continuation of the Wi-Fi communication is necessary after the completion of the transmission of the print job in the portable terminal 10 (S24). The MFP controller 21 performs the determination using at least one of the processing information included in the above-described print job, information on the MFP, and the Wi-Fi connection request. Specifically, in the case of using two or more determination elements among a plurality of determination elements appearing next, it is preferable that the MFP controller 21 determines that the connection continuation is necessary if the determination result by at least one determination element is that the connection continuation is necessary.

[In Case of Using Identification Information of the User or the Like]

This is an example of using the processing information included in the print job. The identification information of at least one of the user and the portable terminal that has an authority to use the printing function of the MFP 20 is stored, as reference identification information, in the memory 21B in advance. If it is determined that the identification information included in the currently received print job does not coincide with the reference identification information, the MFP controller 21 determines that the connection continuation is necessary, because it is necessary for the MFP controller 21 to notify the portable terminal 10 of the print restriction error (see S31).

On the other hand, the print restriction error is an error that cannot be resolved, in which the process based on the currently received print data is prohibited and the prohibition state cannot be resolved. For example, if user A, who does not have authority for color printing, transmits color print data to the MFP 20, the MFP 20 prohibits the printing process of the print data. Accordingly, as far as the MFP 20 is used, the prohibition state is not resolved. On the other hand, if it is determined that the current received identification information coincides with the reference identification information, it is not necessary for the MFP controller 21 to provide a notification of the print restriction error, and the MFP controller 21 determines that continuing the connection continuation is not necessary.

[In Case of Using Information on Data]

This is an example of using the processing information included in the print job. If it is determined that the data amount or the print number of sheets of the received print job exceeds a prescribed value, the MFP controller 21 determines that the connection continuation is necessary. This is because there is high possibility that a print abnormality error, such as exhaustion of print sheets, consumable supplies, such as coloring agents or an exchange during printing, is occurred, and the MFP controller 21 notifies the portable terminal 10 of the print abnormality error (see S33). On the other hand, the print abnormality error is an error can be resolved, for which the prohibition state of the process based on the print data can be resolved by supplement of the print sheets or coloring agents. On the other hand, if it is determined that the print data amount is less than the prescribed value, there is low possibility that the MFP controller 21 notifies the print abnormality error, and thus the MFP controller 21 determines that the connection continuation is not necessary.

[In Case of Using the Processing Condition Information]

This is an example of using the processing information included in the print job. If it is determined that the kind of a print sheet for the received print job is a cardboard or a special size or the printing method is duplex printing or Nin1 printing, or if it is determined there is possibility that conveyance error, such as sheet jam or duplicate feeding, occurs or there is high possibility that the conveyance error occurs, the MFP controller 21 determines that the connection continuation is necessary. This is because there is high possibility that the MFP controller 21 notifies the portable terminal 10 of the error such as sheet jam or the like in this case (see S33).

On the other hand, a conveyance error is an error can be resolved, for which the prohibition state of the process based on the print data can be resolved by removing the jammed print sheet or the like. On the other hand, if the print sheet is a normal sheet or a fixed form sheet or the printing type is one side printing, the MFP controller 21 determines that there is no possibility or low possibility that the conveyance error such as sheet jam occurs. Accordingly, there is low possibility that the MFP controller 21 notifies the print abnormality error, and thus the MFP controller 21 determines that the connection continuation is not necessary.

[In Case of Using Information on the MFP]

The MFP controller 21 determines whether there is possibility that an error occurs based on the state of the MFP 20. If it is determined that the print job is received, for example, in a state where the residual amount of coloring agents or print sheets in the MFP 20 is equal to or smaller than the prescribed amount, the MFP controller 21 determines that the connection continuation is necessary. In this case, there is high possibility that the print abnormality error, such as exhaustion of print sheets or coloring agents, occurs during printing of the print job, and thus there is high possibility that the MFP controller 21 notifies the portable terminal 10 of the print abnormality error (see S33). As described above, the print abnormality error is also the error can be resolved. Additionally, if it is determined that the print job is received in a state where the residual amount of the print sheets or the like exceeds the prescribed amount, there is low possibility that the MFP controller 21 notifies the print abnormality error, and thus the MFP controller 21 determines that the connection continuation is not necessary. In this case, the using information on the MFP is an example of information regarding the second communication device.

[In Case of Using Wi-Fi Connection Request]

If it is determined that the print job is received in the general Wi-Fi method in the Wi-Fi connection request, the MFP controller 21 determines that continuing the connection is necessary. As described above, in the general Wi-Fi method, even if the general Wi-Fi communication connection continues, the portable terminal 10 does not monopolize the wireless communication with the MFP, and exerts little influence on the wireless communication with another portable terminal. Further, since the connection continues, the user can be immediately notified of the error occurrence during the printing. On the other hand, if it is determined that the print job is received in the WFD method in the Wi-Fi connection request, the MFP controller 21 determines that continuing the connection is not necessary. In the WFD method, the portable terminal 10 monopolizes the wireless communication with the MFP 20 unless the connection of the WFD communication is terminated. Accordingly, by early cutting off the connection of the WFD communication, it is possible for another communication device to perform wireless communication with the MFP 20. In this case, the using Wi-Fi connection request is an example of information regarding the wireless communication.

As described above, if it is determined that the connection continuation is necessary based on the determination result by at least one determination element (YES in S24), the MFP controller 21 transmits the connection continuation request (example of information corresponding to the selection result) to the portable terminal 10 through the Wi-Fi communication (S25), and starts printing based on the received print data (S27). On the other hand, if it is determined that the connection continuation is not necessary (NO in S24), the MFP controller 21 transmits a normal response (example of information corresponding to the selection result) to the portable terminal 10 through the Wi-Fi communication (S26), and proceeds to S27. If it is determined that the printing, which starts in S27, is normally completed (YES in S28), the MFP controller 21 transmits the print completion notification to the portable terminal 10 through the Wi-Fi communication (S29), and terminates the processing of MFP.

If it is determined that the printing is not completed and the print restriction error occurs (NO in S28 and YES in S30), the MFP controller 21 transmits the print restriction notification to the portable terminal 10 through the Wi-Fi communication (S31), and terminates the processing of MFP. If it is determined that the printing is not completed, the print restriction error does not occur and the print abnormality error occurs (NO in S28 and S30 and YES in S32), the MFP controller 21 transmits the print abnormality notification to the portable terminal 10 through the Wi-Fi communication (S33). Thereafter, if it is determined that the print abnormality error is not resolved by the user (NO in S34), the MFP controller 21 resumes the printing, transmits the print resuming notification to the portable terminal 10 through the Wi-Fi communication (S35), and returns to S28.

(Sequence when there is a Connection Continuation Request and when there is not the Connection Continuation Request)

Figure 4:
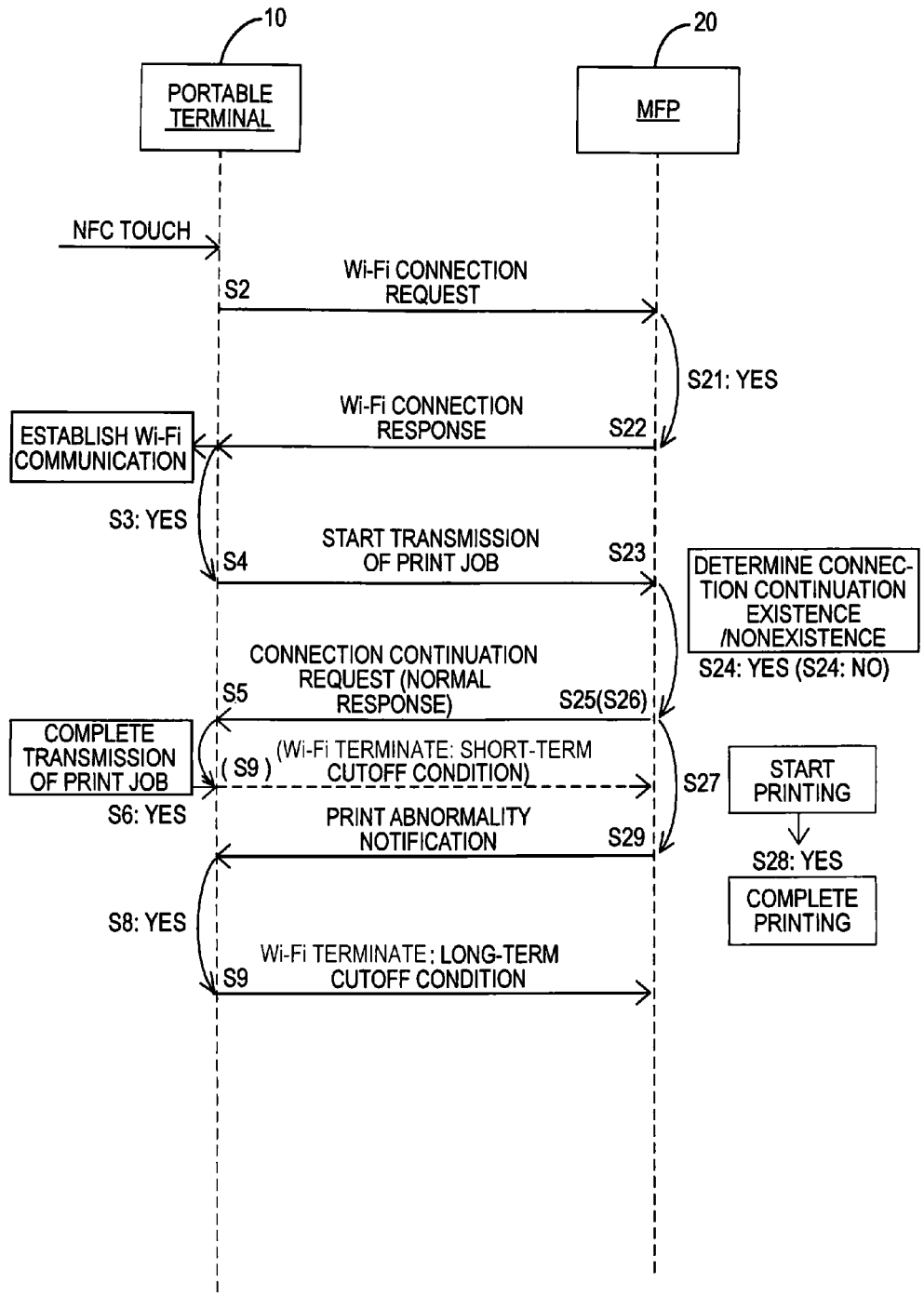
FIG. 4 is a sequence diagram in the case where there is a connection continuation request and in the case where there is not the connection continuation request.

FIG. 4 illustrates a sequence in the case where the MFP 20 transmits a connection continuation request (S25), and the portable terminal 10 receives the connection continuation request (S5). In this case, after completion of the transmission of the print job (YES in S6), the portable terminal 10 waits until a print completion notification is received from the MFP 20 as the long-term cutoff condition, and then terminates the connection of the Wi-Fi communication (YES in S8 and S9).

Further, in the drawing, the sequence in the case where the MFP 20 transmits a normal response (S26) and the portable terminal 10 receives the normal response (S5) is shown in parentheses. In this case, after completion of the transmission of the print job (YES in S6), the portable terminal 10 immediately terminates the connection of the Wi-Fi communication before the print completion notification is received (S9) as the short-term cutoff condition. As described above, in the case where there is high possibility that the error occurs in the process based on the print data (YES in S24), the connection of the Wi-Fi communication is terminated after a long time elapses from the completion of the transmission of the print data as compared with the case where it is determined that the possibility is low. Through this, it is possible to suppress the situation that the portable terminal 10 is unable to receive the print restriction notification or the print abnormality notification.

(Sequence when an Error that Cannot be Resolved Occurs and when an Error that can be Resolved Occurs)

Figure 5:
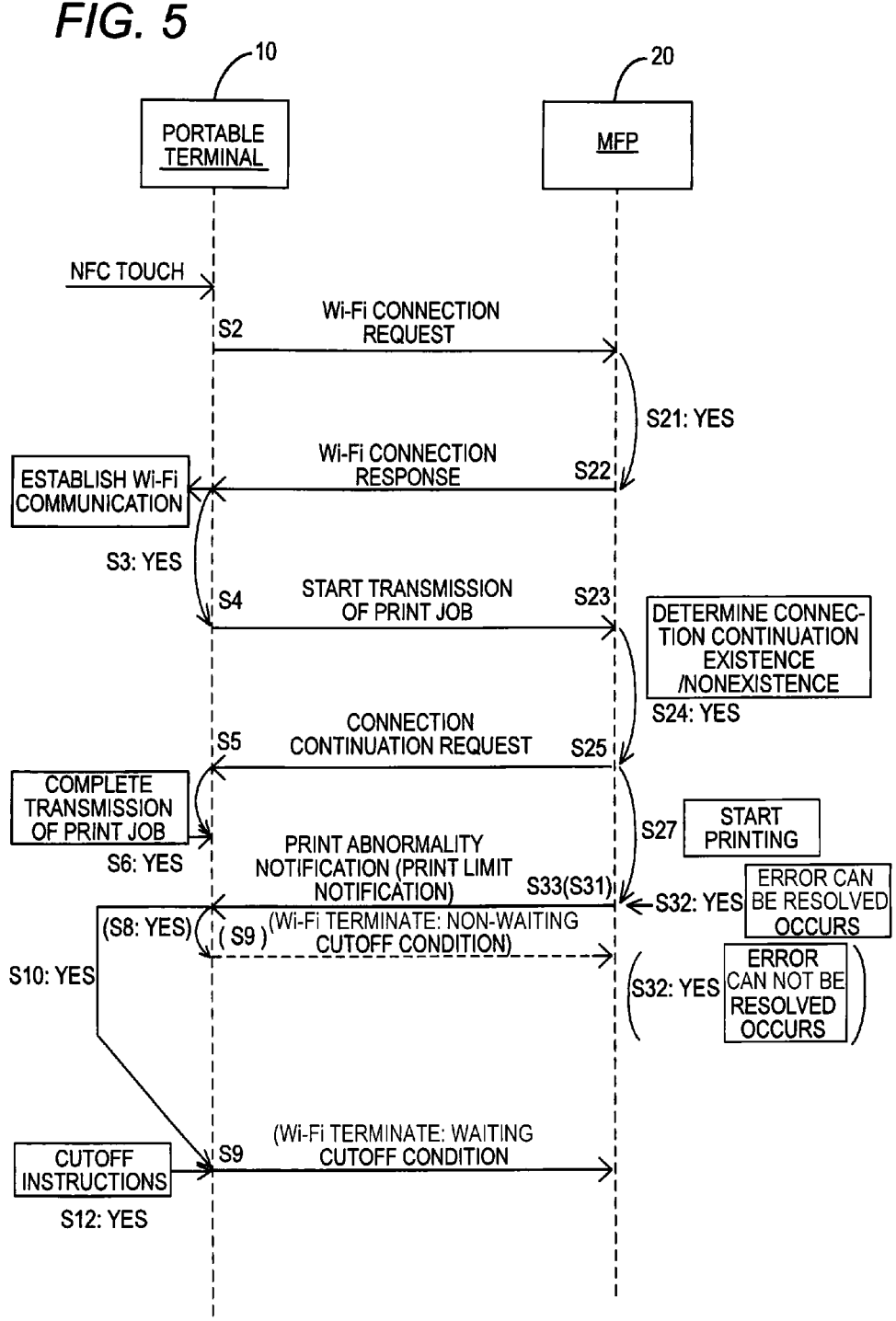
FIG. 5 is a sequence diagram in the case where an error cannot be resolved occurs and in the case where an error can be resolved occurs.

FIG. 5 illustrates a sequence in the case where the print abnormality error can be resolved occurs in the MFP 20 (YES in S32) and the portable terminal 10 receives the print abnormality notification (YES in S10). In this case, after completion of the transmission of the print job (YES in S6), the portable terminal 10 waits until user's cutoff instructions is received as the waiting cutoff condition, and then terminates the connection of the Wi-Fi communication (YES in S12 and S9).

Further, in the drawing, a sequence in the case where the print restriction error cannot be resolved occurs in the MFP 20 (YES in S30) and the portable terminal 10 receives the print restriction notification (YES in S8) is shown in parentheses. In this case, after completion of the transmission of the print job (YES in S6), the portable terminal 10 immediately terminates the connection of the Wi-Fi communication before the cutoff instruction is received as the non-waiting cutoff condition (S9). Through this, if the error can be resolved occurs, the efforts for reconnection of the Wi-Fi communication can be reduced through maintaining the connection of the Wi-Fi communication, while if the error cannot be resolved occurs, unnecessary power consumption can be suppressed through relatively early cutoff of the connection of the Wi-Fi communication.

Effects of this Embodiment

The wireless communication system 1 selects any one of a plurality of different cutoff conditions to terminate the connection of the Wi-Fi communication by the interface when the data transmission is completed, and it terminates the connection of the Wi-Fi communication if it is determined that the selected cutoff condition is satisfied. That is, according to this wireless communication system 1, depending on which of plural cutoff conditions is selected, the connection of wireless communication can be terminate with different conditions. Through this, convenience of the Wi-Fi communication can be improved as compared with the configuration that always terminates the connection of the Wi-Fi communication with the same condition after completion of the data transmission.

Embodiment 2

Figure 6:
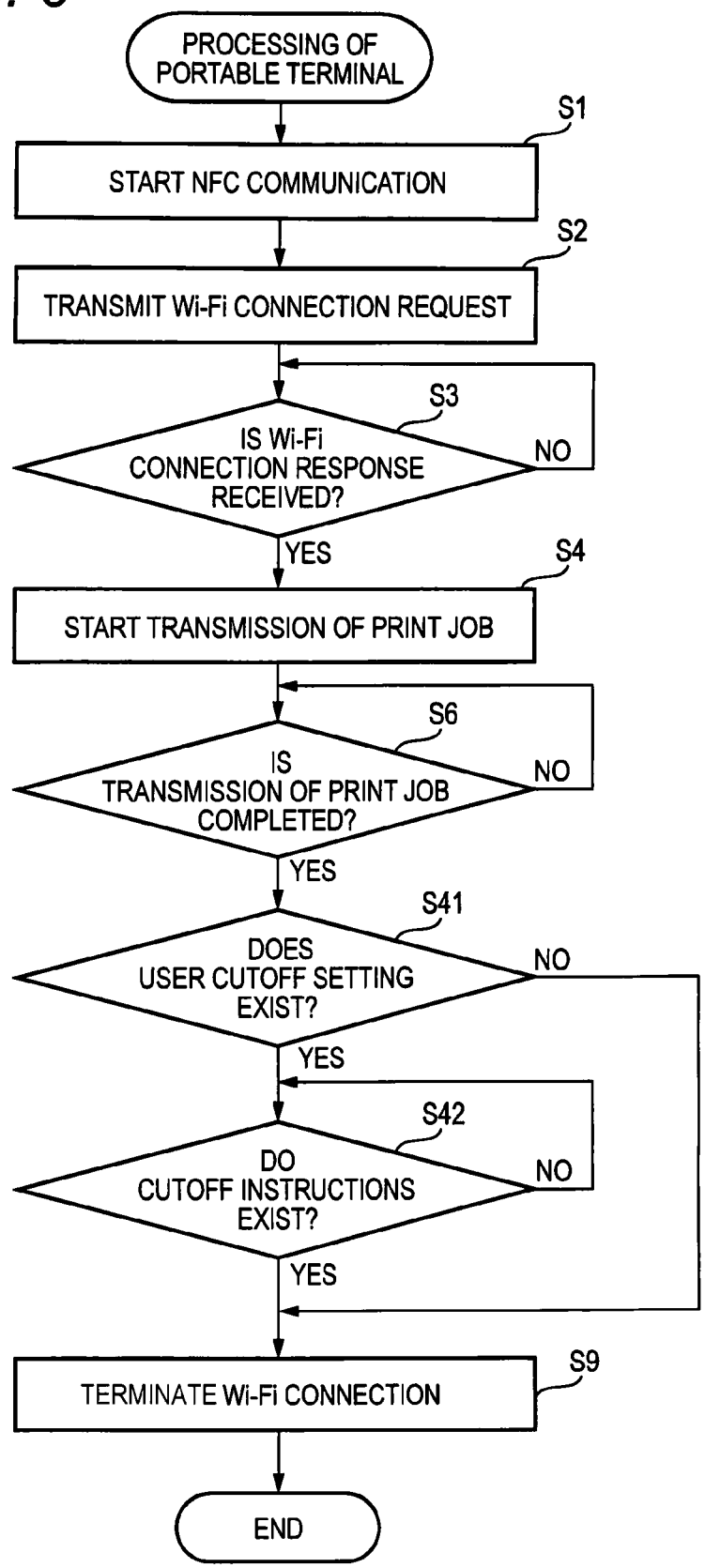
FIG. 6 is a flowchart illustrating processing of portable terminal according to embodiment 2.
Figure 7:
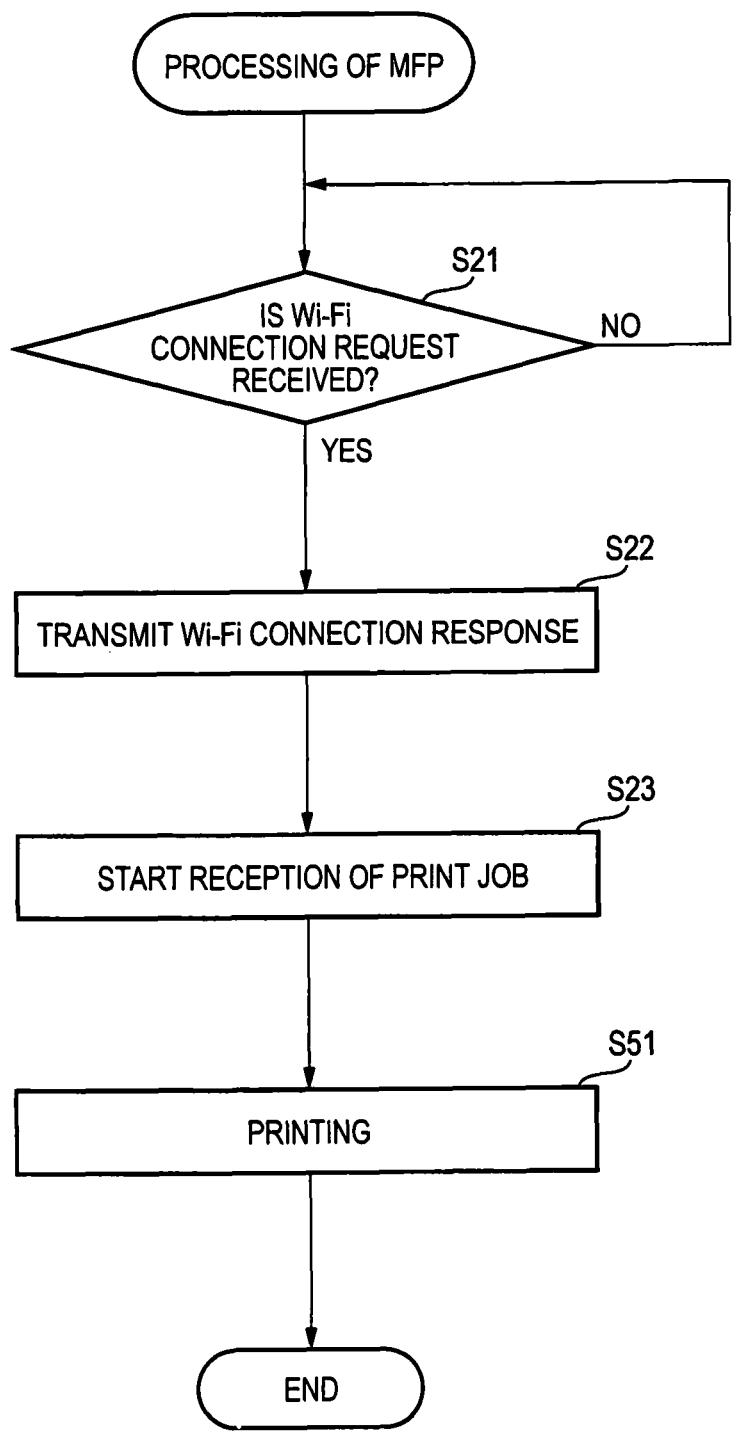
FIG. 7 is a flowchart illustrating processing of MFP.

FIGS. 6 and 7 illustrate embodiment 2. Embodiment 2 is different from embodiment 1 in the contents of the processing of portable terminal and the processing of MFP, but other points are similar to those according to embodiment 1. Accordingly, the same reference numerals are used for the same constituent elements as those according to embodiment 1, duplicate explanation thereof will be omitted, and only different points will be explained hereinafter.

(Processing of Portable Terminal)

First, the user may input a user cutoff setting (an example of information regarding the first communication device) in advance through the operation unit 14 in addition to execution instructions such as the print function. The user cutoff setting is the setting that enables the cutoff time of the connection of the Wi-Fi communication to be optionally determined by the user's cutoff instruction. The terminal controller 11 stores the input result of the existence/nonexistence of the user cutoff setting in the memory 11B, and transmits the print job to the MFP 20 through the Wi-Fi communication after starting of the processing of portable terminal illustrated in FIG. 6 (S4). Accordingly, the terminal controller 11 can determine whether the transmission of the print job is completed without the necessity of the processing of S5 in FIG. 2A (S6).

If it is determined that the transmission of the print job is completed (YES in S6), the terminal controller 11 determines whether there is the user cutoff setting (S41). The terminal controller 11 refers to the memory 11B, and if it is determined that there is the user cutoff setting (YES in S41) and there is the user's cutoff instruction (YES in S42), the terminal controller 11 terminates the connection of the Wi-Fi communication (S9), and terminates the processing of portable terminal. The cutoff condition at this time is to terminate the connection of the Wi-Fi communication until the cutoff instruction is received from the completion of the transmission of the print job, and it is an example of a waiting cutoff condition.

On the other hand, the terminal controller 11 refers to the memory 11B, and if it is determined that there is no user cutoff setting (NO in S41), the terminal controller 11 terminates the connection of the Wi-Fi communication regardless of the user's cutoff instruction (S9), and terminates the processing of portable terminal. The cutoff condition at this time is to terminate the connection of the Wi-Fi communication before the cutoff instruction is received, from the completion of the transmission of the print job, and it is an example of a non-waiting cutoff condition.

(Processing of MFP)

If the reception of the print job starts (S23) after starting of the processing of MFP illustrated in FIG. 7, the MFP controller 21 executes the print processing (S51), and terminates the processing of MFP. On the other hand, the MFP controller 21 may transmit the above-described print completion notification, the print restriction notification, or the print abnormality notification to the side of the portable terminal 10. In this case, it is preferable that the terminal controller 11 is configured to terminate the connection of the Wi-Fi communication regardless of the reception of the notifications if it is determined that there is the cutoff instruction (YES in S42). By the above-described configuration, the cutoff timing of the connection of the Wi-Fi communication can be determined according to the user's intention.

Other Embodiments

The technology disclosed in the description is not limited to the embodiment as explained above by the description and the drawings, but includes, for example, various aspects as follows.

"The first communication device" is not limited to the portable terminal 10, but may be a personal computer or a server.

In the above-described embodiment, the terminal controller 11 and the MFP controller 21 are configured to execute the respective processes of FIGS. 2, 3, 6, and 7 through the CPU. However, the configuration of the terminal controller 11 and the MFP controller 21 is not limited thereto, but the terminal controller 11 and the MFP controller 21 may be configured to execute the respective processes in FIGS. 2, 3, 6, and 7 through a plurality of CPUs, through a hard circuit, such as an ASIC (Application Specific Integrated Circuit), only, or through the CPU and the hard circuit.

The wireless LAN interfaces 12 and 22 may be configured to execute only any one of the wireless communication according to the Wi-Fi direct method (hereinafter referred to as "WFD method") and the wireless communication according to the general Wi-Fi. Further, "the first long-distance interface" and "the second long-distance interface" may be an interface for executing NFC wireless communication, infrared communication, Bluetooth®, and Transfer Jet® in addition to the Wi-Fi wireless communication.

"The first short-distance interface" and "the second short-distance interface" may be an interface for executing infrared communication, Bluetooth®, and Transfer Jet® in addition to the NFC wireless communication.

"The second communication device" is not limited to the MFP that can execute the printing function and the scanning function, but may be a printer that can execute only the printing function or a scanner that can execute only the scanning function. Further, "the second communication device" may be a device (e.g., a PC, a server, a portable phone, or a smart phone) that executes a function that is different from the printing function or the scanning function (e.g., image display function, data operation function, or facsimile function).

"The processing execution unit" is not limited to the printing execution unit 26, and may execute the process based on the data. For example, the processing execution unit may execute the function of the reading execution unit 27, image display function, and data operation function.

"The long-term cutoff condition" may be a condition on which the connection of the Wi-Fi communication is terminated when a predetermined time elapses from the completion of the transmission of the print job.

"The short-term cutoff condition" is not limited to a condition on which the connection of the Wi-Fi communication is terminated immediately after the completion of the transmission of the print job, but may be a condition on which the connection of the Wi-Fi communication is terminated when a shorter time than that on the long-term cutoff condition elapses from the completion of the transmission of the print job.

The cutoff instruction is not limited to be received by the operation unit 14 of the portable terminal 10, but may be received by the operation unit 24 (an example of an interface) of the MFP 20 (an example of a wireless communication device).

The MFP controller 21 (an example of a controller) may determine whether the connection continuation of the Wi-Fi communication is necessary before the reception of the print job (before S23). For example, the MFP controller 21 may first receive only the processing information from the portable terminal 10, and may start the reception of the print job after determining whether the connection continuation is necessary. In this case, the MFP controller 21 may receive the processing information through the NFC communication. Further, the MFP controller 21 may be configured to determine whether the connection continuation is necessary after the completion of the printing (S28) after the start of the printing (S27). Further, the terminal controller 11 of the portable terminal 10 may be configured to determine whether the connection continuation is necessary. In this case, the transmission and reception of the connection continuation request (S5 and S25) become unnecessary. However, it is necessary to receive only the information on the MFP from the MFP 20.

In the above-described embodiments, the MFP controller 21 may be configured to terminate the connection of the Wi-Fi communication based on the result of the determination in S28, S30, and S32.

The MFP 20 may be configured so that the operation unit 24 receives the user cutoff setting. Further, the MFP controller 21 may be configured to execute the processing that corresponds to S41, S42, and S9, for example, after S23.

What is claimed is:

1. A wireless communication system comprising:
   a first communication device, which has a first controller coupled to a first interface configured to perform wireless communication; and
   a second communication device, which has a second controller coupled to a second interface configured to perform wireless communication,
   wherein the first interface includes a first long-distance interface and a first short-distance interface which is capable of communicating in a shorter distance than the first long-distance interface;
   wherein the second interface includes a second long-distance interface and a second short-distance interface which is capable of communicating in a shorter distance than the second long-distance interface; and
   wherein at least one of the first controller and the second controller is configured to:
      transmit data from the first communication device to the second communication device after establishing a wireless communication connection between the first communication device and the second communication device;
      determine, based on one of information regarding the data, information regarding the wireless communication, information regarding the first communication device and information regarding the second communication device, one of a plurality of different cutoff conditions as a cutoff condition;
      terminate the wireless communication connection which has been performed by the first interface and the second interface after the data transmission is completed if the determined cutoff condition is satisfied;
      transmit setting information from the first communication device to the second communication device via the first short-distance interface and the second short-distance interface; and
      establish the wireless communication connection by the first long-distance interface and the second long-distance interface by using the received setting information.

2. The wireless communication system according to claim 1,
   wherein the second communication device has a process execution unit executing a process based on the data,
   wherein the plurality of different cutoff conditions include a short-term cutoff condition and a long-term cutoff condition, and wherein time from the completion of the data transmission to the termination of the wireless communication connection, in case of the long-term cutoff condition is longer than time in case of the short-term cutoff condition, and
   wherein the at least one of the first controller and the second controller is configured to:
      estimate, based on one of information regarding the data, information regarding the wireless communication and information regarding the second communication device, whether there is probability that an error occurs during the executed process based on the data;
      determine the short-term cutoff condition as the cutoff condition if it is not estimated that there is probability that the error occurs; and
      determine the long-term cutoff condition as the cutoff condition if it is estimated that there is probability that the error occurs.

3. The wireless communication system according to claim 1, wherein the at least one of the first controller and the second controller is configured to:
   receive a cutoff instruction, wherein the plurality of different cutoff conditions include a waiting cutoff condition, on which the wireless communication connection is terminated upon receiving the cutoff instruction and a non-waiting cutoff condition, on which the wireless communication connection is terminated before receiving the cutoff instruction;
   judge whether an error that occurred during the executed process based on the data can be resolved;
   determine the waiting cutoff condition as the cutoff condition if it is judged that the error can be resolved; and
   determine the non-waiting cutoff condition as the cutoff condition if it is judged that the error cannot be resolved.

4. The wireless communication system according to claim 1,
   wherein one of the information regarding the first communication device and the information regarding the second communication device includes a waiting cutoff setting,
   wherein the at least one of the first controller and the second controller is configured to:
      receive a cutoff instruction and an input of the waiting cutoff setting, wherein the plurality of different cutoff conditions include a waiting cutoff condition, on which the wireless communication connection is terminated upon receiving the cutoff instruction, and a non-waiting cutoff condition, on which the wireless communication connection is terminated before receiving the cutoff instruction,
      judge whether the cutoff instruction is received while the waiting cutoff setting has been input,
      determine the waiting cutoff condition as the cutoff condition if it is judged that the cutoff instruction is received while the waiting cutoff setting has been input, and
      determine the non-waiting cutoff condition as the cutoff condition if it is judged that the cutoff instruction is received while the waiting cutoff setting has not been input.

5. The wireless communication system according to claim 1,
   wherein both the first interface and the second interface are configured to execute an indirect wireless communication via an access point and a direct wireless communication without the access point,
   wherein the plurality of cutoff conditions include a short-term cutoff condition and a long-term cutoff condition, and wherein time, from the completion of the data transmission to the termination of the wireless communication connection, in case of the long-term cutoff condition is longer than time in case of the short-term cutoff condition,
   wherein the at least one of the first controller and the second controller is configured to:
      determine the long-term cutoff condition as the cutoff condition if the data is transmitted by the indirect wireless communication, and determine the short-term cutoff condition as the cutoff condition if the data is transmitted by the direct wireless communication.

6. A wireless communication device configured to receive data from an external device, comprising:
   an interface configured to perform wireless communication; and
   a controller configured to:
      receive the data from the external device through the interface after establishing a wireless communication connection between the wireless communication device and the external device;
      determine, based on one of information regarding the data, information regarding the wireless communication and information regarding the wireless communication device, one of a plurality of different cutoff conditions as a cutoff condition to terminate the wireless communication connection by the interface after data reception is completed; and
      transmit information according to the determined cutoff condition to the external device,
   wherein the plurality of different cutoff conditions include at least one of:
      a cutoff condition in which a cutoff timing is determined based on estimating whether there is a probability that an error occurs during an executed process;
      a cutoff condition in which a cutoff timing is determined based on judging whether an error occurred during the executed process based on the data can be resolved;
      a cutoff condition in which a cutoff timing is determined based on judging whether a cutoff instruction is received while a waiting cutoff setting has been input, wherein the information regarding the wireless communication device includes the waiting cutoff setting; and
      a cutoff condition, in which a cutoff timing is determined based on determining whether the data is transmitted by indirect wireless communication or the data is transmitted by direct wireless communication.

7. The wireless communication device according to claim 6,
   wherein the plurality of different cutoff conditions include a short-term cutoff condition and a long-term cutoff condition, wherein time, from the completion of the data reception to the cutoff of the wireless communication connection, in case of the long-term cutoff condition is longer than time in case of the short-term cutoff condition.

8. The wireless communication device according to claim 6, wherein the controller is configured to:
   receive the cutoff instruction,
   wherein the plurality of different cutoff conditions include a waiting cutoff condition, on which the wireless communication connection is terminated upon receiving the cutoff instruction and a non-waiting cutoff condition, on which the wireless communication connection is terminated before receiving the cutoff instruction is terminated.

9. A wireless communication system comprising the wireless communication device according to claim 6.

10. A non-transitory computer-readable medium having instructions causing a wireless communication device having an interface performing wireless communication with an external device to perform operations comprising:
   transmitting data to the external device through the interface;
   determining, based on one of information regarding the data, information regarding the wireless communication, information regarding the external device and information regarding the wireless communication device, one of a plurality of different cutoff conditions; and
   terminating a wireless communication connection which has being performed by the interface after the data transmission is completed if the determined cutoff condition is satisfied,
   wherein the plurality of different cutoff conditions include at least one of:
      a cutoff condition in which a cutoff timing is determined based on estimating whether there is a probability that an error occurs during an executed process;
      a cutoff condition in which a cutoff timing is determined based on judging whether an error occurred during the executed process based on the data can be resolved;
      a cutoff condition in which a cutoff timing is determined based on judging whether a cutoff instruction is received while a waiting cutoff setting has been input, wherein the information regarding the wireless communication device includes the waiting cutoff setting; and
      a cutoff condition, in which a cutoff timing is determined based on determining whether the data is transmitted by an indirect wireless communication or the data is transmitted by a direct wireless communication.

11. The non-transitory computer-readable medium according to claim 10, wherein the plurality of different cutoff conditions include a short-term cutoff condition and a long-term cutoff condition, wherein time, from the completion of the data transmission to the cutoff of the wireless communication connection, in case of the long-term cutoff condition is longer than time in case of the short-term cutoff condition.

12. The non-transitory computer-readable medium according to claim 10, wherein the instructions causes the wireless communication device to perform further operations comprising:
   receiving the cutoff instruction, wherein the plurality of different cutoff conditions include a waiting cutoff condition, on which the wireless communication connection is terminated upon receiving the cutoff instruction and a non-waiting cutoff condition, on which the wireless communication connection is terminated before receiving the cutoff instruction is terminated.

* * * * *